US012464232B2

(12) United States Patent
Nakano (10) Patent No.: US 12,464,232 B2
(45) Date of Patent: Nov. 4, 2025

(54) CONTROL APPARATUS, IMAGE CAPTURING SYSTEM AND CONTROL METHOD THEREOF, AND STORAGE MEDIUM

(71) Applicant: CANON KABUSHIKI KAISHA, Tokyo (JP)

(72) Inventor: Katsuya Nakano, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 18/406,759

(22) Filed: Jan. 8, 2024

(65) Prior Publication Data

US 2024/0236512 A1 Jul. 11, 2024

(30) Foreign Application Priority Data

Jan. 10, 2023 (JP) ................................. 2023-001915

(51) Int. Cl.
*H04N 23/661* (2023.01)
*H04N 23/61* (2023.01)
*H04N 23/667* (2023.01)
*H04N 23/90* (2023.01)

(52) U.S. Cl.
CPC ........... *H04N 23/662* (2023.01); *H04N 23/61* (2023.01); *H04N 23/661* (2023.01); *H04N 23/667* (2023.01); *H04N 23/90* (2023.01)

(58) Field of Classification Search
CPC .... H04N 23/61; H04N 23/611; H04N 23/661; H04N 23/662; H04N 23/667; H04N 23/90
See application file for complete search history.

(56) References Cited

U.S. PATENT DOCUMENTS

| 2016/0050357 A1* | 2/2016 | Iijima | ................... | H04N 23/90 |
| | | | | 348/211.2 |
| 2022/0122274 A1* | 4/2022 | Liu | ....................... | G06V 40/161 |
| 2022/0224822 A1* | 7/2022 | Takahashi | ............ | H04N 23/662 |

FOREIGN PATENT DOCUMENTS

JP    2009-296323 A    12/2009

* cited by examiner

*Primary Examiner* — Daniel M Pasiewicz
(74) *Attorney, Agent, or Firm* — Cowan, Liebowitz & Latman, P.C.

(57) ABSTRACT

A control apparatus comprises: an acquisition unit that acquires information about a subject from a plurality of image capturing apparatuses connected to an image capturing system via a communication network; a determination unit that determines a reference apparatus among the plurality of image capturing apparatuses, which serves as a reference for synchronizing time between the plurality of image capturing apparatuses based on the acquired information about the subject; and a communication unit that communicates information indicating whether or not each image capturing apparatus is the reference apparatus to each of the plurality of image capturing apparatuses. The plurality of image capturing apparatuses are capable of synchronous shooting in synchronization with the time of the reference apparatus.

13 Claims, 8 Drawing Sheets

CONTROL APPARATUS, IMAGE CAPTURING SYSTEM AND CONTROL METHOD THEREOF, AND STORAGE MEDIUM

BACKGROUND OF THE INVENTION

Field of the Invention

The present invention relates to a control apparatus, an image capturing system, a control method thereof, and a storage medium, and more particularly to a technique for synchronizing shooting timings of a plurality of image capturing apparatuses in an image capturing system that generates an image using a plurality of images shot by the plurality of image capturing apparatuses.

Description of the Related Art

There is an image capturing system that synchronizes the shooting timing of a plurality of image capturing apparatuses by synchronizing the times of the plurality of image capturing apparatuses. In such a synchronous image capturing system, synchronous shooting is realized by simultaneously synchronizing the times of the plurality of image capturing apparatuses and simultaneously performing shooting at a predetermined time. In such a synchronized image capturing system, among a plurality of image capturing apparatuses, the image capturing apparatus that manages the time which serves as the reference for synchronization is called the primary apparatus, and the image capturing apparatus that synchronizes its time to the time of the primary apparatus is called the secondary apparatus. Then, by adjusting the time of one or more secondary apparatuses to the time of one primary apparatus, the time of all the image capturing apparatuses is synchronized.

In a synchronous image capturing system, applications such as three-dimensional image generation can be realized by performing synchronous shooting with a plurality of image capturing apparatuses, collecting images taken by the image capturing apparatuses, and performing processing such as image synthesis. At this time, if the synchronized time of one of the image capturing apparatuses are shifted due to various reasons such as a variation of processing time delays and a variation of communication delays in the image capturing apparatus the difference in synchronized time will cause a difference in shooting timings of the image capturing apparatuses. There is a problem in that the image quality of an image generated based on the images captured by the image capturing apparatuses will drop due to the difference in the image shooting timing between the image capturing apparatuses.

Therefore, in order to align the shooting timings in the image capturing apparatuses, Japanese Patent Laid-Open No. 2009-296323 discloses a technique that the master apparatus measures the delay time of the slave apparatus in advance, and the shooting timing for synchronous shooting is determined based on the measured delay time.

However, the technology disclosed in Japanese Patent Laid-open No. 2009-296323 cannot synchronize the times of the plurality of image capturing apparatuses in environments where communication delay time is not constant, such as communication via a network, or environments where processing time is not constant, such as software processing within an apparatus, even if a constant amount of delay time is subtracted. For this reason, with the method disclosed in Japanese Patent Laid-open No. 2009-296323, it is not possible to synchronize the shooting timings of the plurality of image capturing apparatuses, and the shooting times may deviate. Therefore, there has been a problem in that the image quality of an image generated using images obtained by synchronous shooting may deteriorate.

SUMMARY OF THE INVENTION

The present invention has been made in consideration of the above situation, and suppresses degradation of the image quality of an image generated based on a plurality of images shot with synchronous shooting even in situations where the synchronization timing of a plurality of image capturing apparatuses does not completely match.

According to the present invention, provided is a control apparatus comprising one or more processors and/or circuitry which function as: an acquisition unit that acquires information about a subject from a plurality of image capturing apparatuses connected to an image capturing system via a communication network; a determination unit that determines a reference apparatus among the plurality of image capturing apparatuses, which serves as a reference for synchronizing time between the plurality of image capturing apparatuses based on the acquired information about the subject; and a communication unit that communicates information indicating whether or not each image capturing apparatus is the reference apparatus to each of the plurality of image capturing apparatuses, wherein the plurality of image capturing apparatuses are capable of synchronous shooting in synchronization with the time of the reference apparatus.

Further, according to the present invention, provided is an image capturing system in which a plurality of image capturing apparatuses are connected via a communication network, including a control apparatus comprising one or more processors and/or circuitry which function as: an acquisition unit that acquires information about a subject from a plurality of image capturing apparatuses connected to an image capturing system via a communication network; a determination unit that determines a reference apparatus among the plurality of image capturing apparatuses, which serves as a reference for synchronizing time between the plurality of image capturing apparatuses based on the acquired information about the subject; and a communication unit that communicates information indicating whether or not each image capturing apparatus is the reference apparatus to each of the plurality of image capturing apparatuses, wherein the plurality of image capturing apparatuses are capable of synchronous shooting in synchronization with the time of the reference apparatus, and wherein each of the plurality of image capturing apparatuses comprises: an image sensor; and a control unit that controls to synchronize time with the reference apparatus and perform synchronous shooting by the image sensor.

Furthermore, according to the present invention, provided is a control method for controlling an image capturing system in which a plurality of image capturing apparatuses are connected via a communication network, comprising: acquiring information about a subject from a plurality of image capturing apparatuses connected to an image capturing system via a communication network; determining a reference apparatus among the plurality of image capturing apparatuses, which serves as a reference for synchronizing time between the plurality of image capturing apparatuses based on the acquired information about the subject; and communicating information indicating whether or not each image capturing apparatus is the reference apparatus to each of the plurality of image capturing apparatuses, wherein the plurality of image capturing apparatuses perform synchronous shooting in synchronization with the time of the reference apparatus.

Further, according to the present invention, provided is a non-transitory computer-readable storage medium, the storage medium storing a program that is executable by the computer, wherein the program includes program code for causing the computer to function as a control apparatus comprising: an acquisition unit that acquires information about a subject from a plurality of image capturing apparatuses connected to an image capturing system via a communication network; a determination unit that determines a reference apparatus among the plurality of image capturing apparatuses, which serves as a reference for synchronizing time between the plurality of image capturing apparatuses based on the acquired information about the subject; and a communication unit that communicates information indicating whether or not each image capturing apparatus is the reference apparatus to each of the plurality of image capturing apparatuses, wherein the plurality of image capturing apparatuses are capable of synchronous shooting in synchronization with the time of the reference apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1:
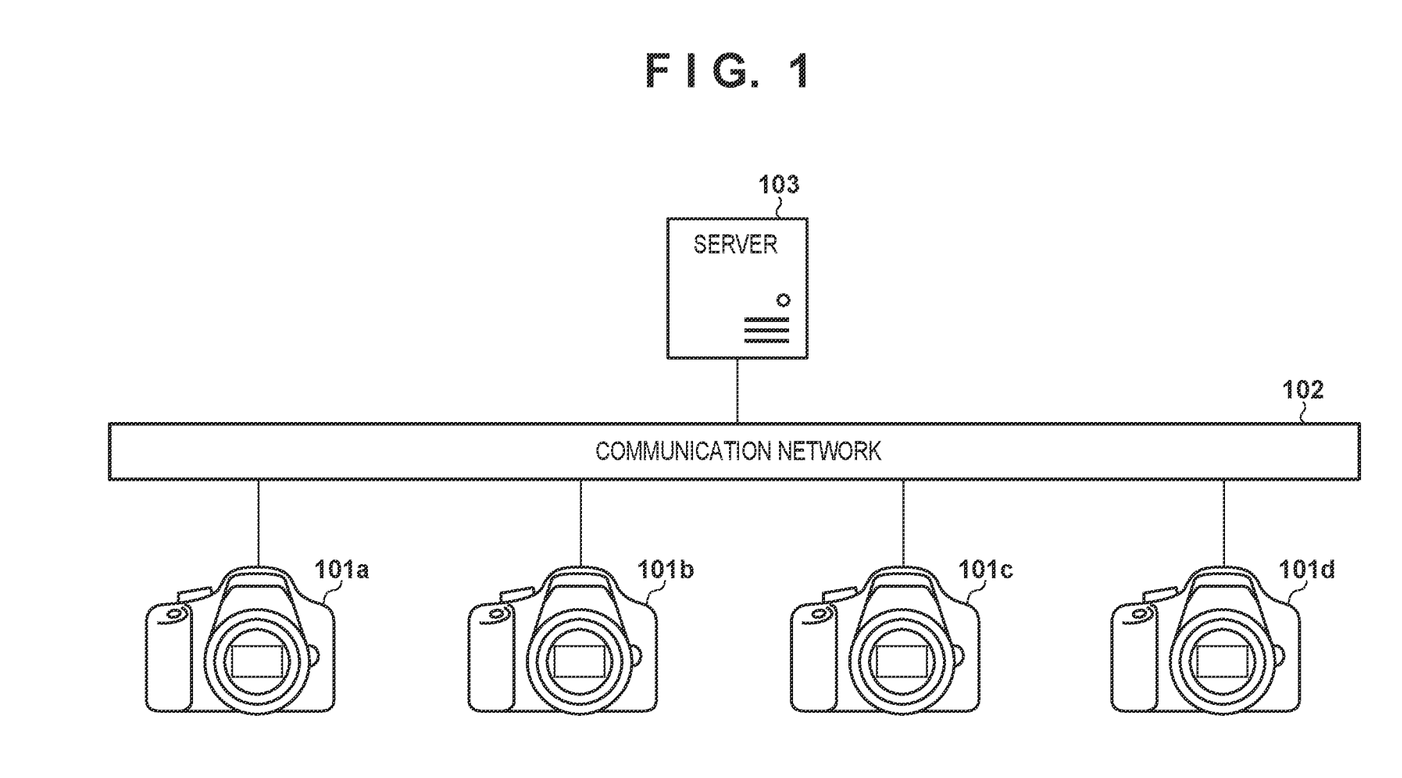
FIG. 1 is a diagram illustrating an example of an overall configuration of an image capturing system according to an embodiment of the present invention.

FIG. 1 is a diagram illustrating an example of an overall configuration of an image capturing system according to an embodiment of the present invention.

As shown in FIG. 1, the image capturing system according to the present invention includes image capturing apparatuses 101a to 101d, a server 103, and a communication network 102 such as a LAN or the Internet. The image capturing apparatuses 101a to 101d are four identical image capturing apparatuses, connected to the communication network 102. The image capturing apparatuses 101a to 101d and the server 103 communicate various information via the communication network 102.

In this embodiment, the image capturing apparatuses 101a to 101d and the server 103 will be described, but the present invention is not limited to this, and various electronic devices with a shooting function may be used as the image capturing apparatus. For example, a mobile phone, a tablet terminal, or the like with a shooting function may be used as the image capturing apparatus. Furthermore, in this embodiment, four image capturing apparatuses are described as being included in the image capturing system, however, the number of image capturing apparatuses is not limited to four, and may be any number of image capturing apparatuses.

Further, images captured by the image capturing apparatuses 101a to 101d are transmitted to the server 103, and the server 103 combines the plurality of received images to create another image, such as a three-dimensional image.

Figure 2:
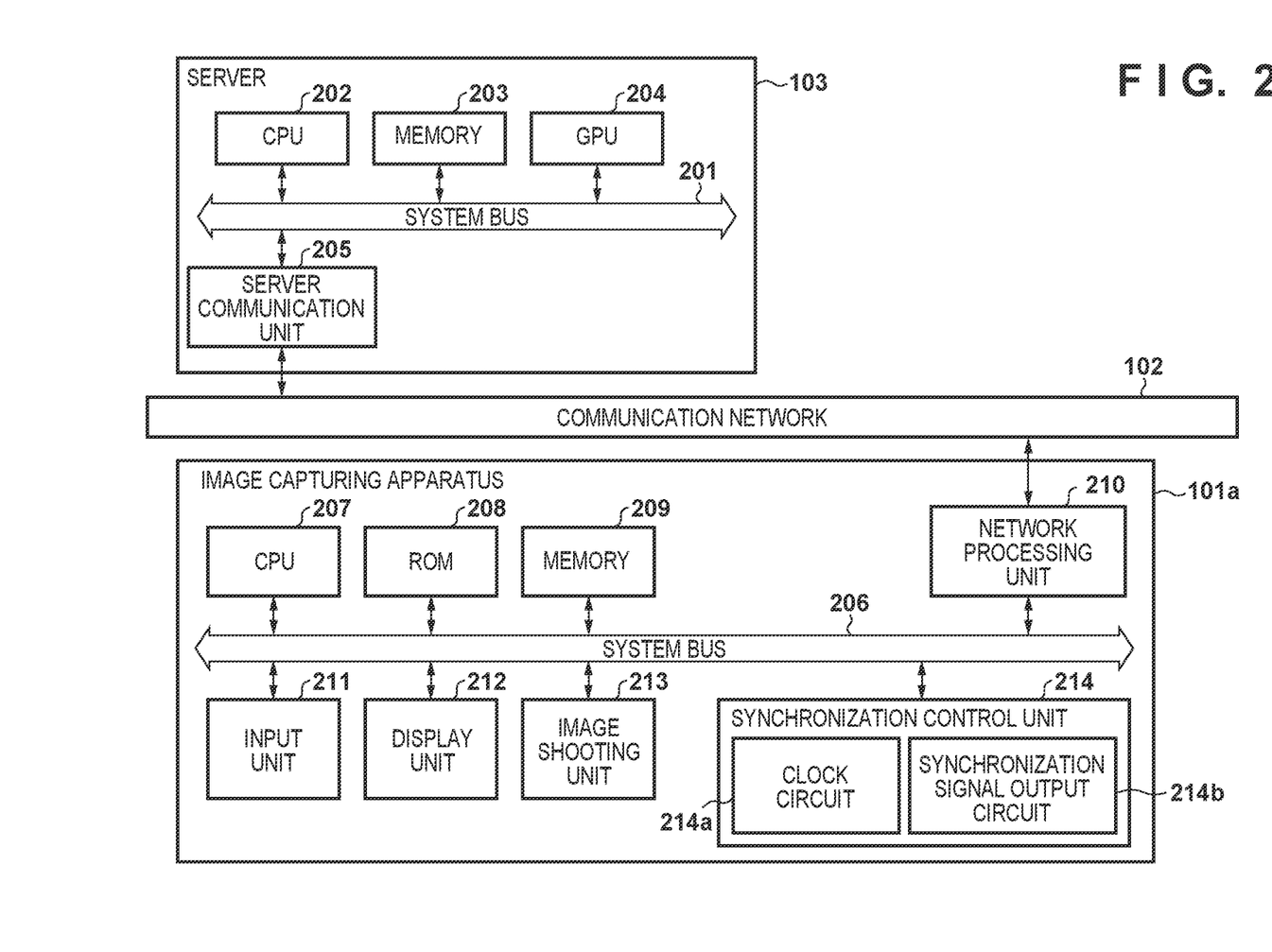
FIG. 2 is a block diagram illustrating an example of a hardware configuration of a server and an image capturing apparatus according to an embodiment.

FIG. 2 is a block diagram illustrating an example of a hardware configuration in this embodiment. Here, the hardware configuration of the server 103 and the image capturing apparatus 101a, representatively, among the image capturing apparatuses 101a to 101d is shown.

The image capturing apparatus 101a has a configuration in which a CPU 207, a ROM 208, a memory 209, a network processing unit 210, an input unit 211, a display unit 212, an image shooting unit 213, and a synchronization control unit 214 are connected via a system bus 206. These units connected to the system bus 206 exchange data with each other via the system bus 206.

The ROM 208 stores various programs for the CPU 207 to operate. Note that the storage location of the various programs for the CPU 207 to operate is not limited to the ROM 208, and may be, for example, a hard disk, or the like. The memory 209 is composed of, for example, a RAM, and the CPU 207 uses the memory 209 as a work memory when performing processing according to a program stored in the ROM 208.

The input unit 211 includes an input device (not shown), receives a user's operation on the input device, generates a control signal according to the operation, and supplies it to the CPU 207. As an input device that accepts user operations, the input unit 211 has, for example, one or a combination of physical operation buttons, switches, touch panels, and the like.

The CPU 207 controls the display unit 212, image shooting unit 213, network processing unit 210, and synchronization control unit 214 according to a program based on the control signal supplied from the input unit 211. This makes the display unit 212, image shooting unit 213, network processing unit 210, and synchronization control unit 214 perform operations according to user operations.

The display unit 212 includes, for example, a display, and also includes a mechanism that outputs a display signal for displaying an image on the display. Note that when a touch panel is used as the input device of the input unit 211, the input device and the display can be integrally configured.

For example, the touch panel is configured so that its light transmittance does not interfere with the display, and is arranged on the upper layer of the display surface of the display. By associating input coordinates on the touch panel with display coordinates on the display, user operations can be accepted.

The image shooting unit 213 is a mechanism that performs a series of shooting processes, and includes a lens, a shutter with an aperture function, an image sensor consisting of a CCD or CMOS device that converts an optical image into an electrical signal, and an image processing unit that performs various image processes such as exposure control, focus adjustment control, and so forth, using a signal output from the image sensor. The image shooting unit 213 is capable of shooting processing according to user operations on the input unit 211 under the control of the CPU 207. Further, the image capturing apparatus 101a can perform shooting in synchronization with the image capturing apparatuses 101b to 101d by performing shooting based on information on the shooting timing from the synchronization control unit 214. Note that how to synchronize the shooting timing will be described later in detail.

The network processing unit 210 communicates with the server 103 and the image capturing apparatuses 101b to 101d via the communication network 102 under the control of the CPU 207.

The synchronization control unit 214 includes a clock circuit 214a for synchronizing time with the image capturing apparatuses 101b to 101d via the network processing unit 210, and a synchronization signal output circuit 214b for synchronizing shooting timing by outputting a synchronization signal from the clock circuit 214a to the image shooting unit 213. The clock circuit 214a is a hardware counter that counts up at predetermined timing to manage time. It also has a function of correcting the counter value in order to synchronize the time with the time of the image capturing apparatuses 101b to 101d through the network processing unit 210. The synchronization signal output circuit 214b outputs a synchronization pulse signal to the image shooting unit 213 when the count value of the clock circuit 214a exceeds a predetermined value, and the image shooting unit 213 uses this synchronization signal as a trigger for shooting, thereby controlling the shooting timing.

The server 103 has a configuration in which a CPU 202, a memory 203, a graphics processing unit (GPU) 204, and a server communication unit 205 are connected via a system bus 201. These units connected to the system bus 201 can exchange data with each other via the system bus 201. The server 103 receives shot images from the image capturing apparatuses 101a to 101d that constitute the image capturing system, and performs image generation such as three-dimensional image synthesis based on the time information of the images.

The memory 203 is composed of, for example, a RAM, and is used as a work memory for the CPU 202 and the GPU 204. It is assumed that the program for operating the CPU 202 is stored within the server 103 or in an external hard disk (not shown), ROM (not shown), or the like.

The server communication unit 205 communicates with the image capturing apparatuses 101a to 101d via the communication network 102 such as a LAN or the Internet under the control of the CPU 202. In this embodiment, the CPU 202 receives communication requests from the image capturing apparatuses 101a to 101d, generates control signals in response to the communication requests, and operates the GPU 204.

The GPU 204 is an arithmetic unit that can perform processing specialized for computer graphics calculations, and in general is capable of performing processing operations required for neural networks such as matrix operations in a shorter time than the CPU 202.

Figure 3:
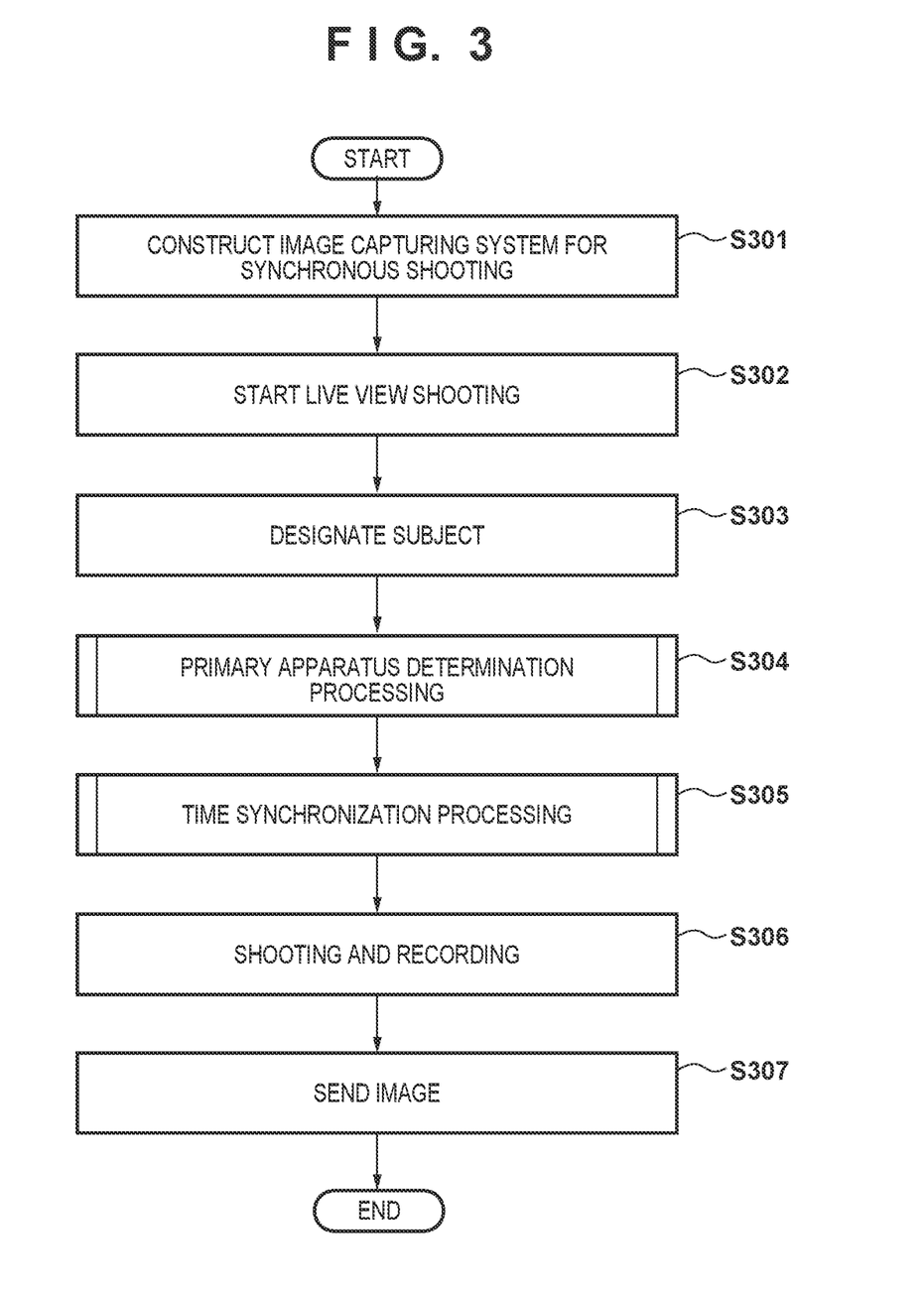
FIG. 3 is a flowchart illustrating synchronous shooting processing by the image capturing system according to the embodiment.

Next, using FIG. 3, a series of processes starting from the image capturing apparatuses 101a to 101d constituting a communication network for synchronizing time among the image capturing apparatuses 101a to 101d until performing synchronous shooting will be explained. This series of processes is performed in response to the user operating an arbitrary one of the plurality of image capturing apparatuses 101a to 101d, and for the sake of explanation, it is assumed here that the operation is performed on the image capturing apparatus 101a. In this embodiment, an example will be described in which processes are performed by operating an arbitrary image capturing apparatus, but the present invention is not limited to this, and the operation may be performed by remote control from a remotely located tablet terminal or the like, for example.

For example, if a user selects a synchronous shooting mode using the input device of the input unit 211 of the image capturing apparatus 101a, and the input unit 211 receives an instruction to start synchronous shooting processing, in step S301, the CPU 207 controls to start communication processing between the image capturing apparatuses 101a to 101d in order to perform synchronous shooting. The CPU 207 controls the network processing unit 210 to perform network communications with the image capturing apparatuses 101b to 101d connected to the communication network 102. Specifically, the CPU 207 sends a packet to inquire about the existence of an image capturing apparatus capable of synchronous shooting via the communication network 102, waits for a reply packet, and specifies an image capturing apparatus or apparatuses capable of synchronous shooting. Here, it is assumed that the image capturing apparatuses 101b to 101d are capable of synchronous shooting. When the CPU 207 receives reply packets from the image capturing apparatuses 101b to 101d capable of synchronous shooting, performs communication with the image capturing apparatuses 101b to 101d from which the replay packets are received to constitute an image capturing system that performs synchronous shooting.

In step S302, the CPU 207 of each of the image capturing apparatuses 101a to 101d controls the image shooting unit 213 to perform live view shooting, and displays the obtained live view image on the display unit 212.

In step S303, the user designates a main subject using the input unit 211 in the live view image displayed on the display unit 212 of the image capturing apparatus 101a. When a subject is designated by the input unit 211, the CPU 207 identifies the designated subject and notifies the other image capturing apparatuses 101b to 101d of the image capturing system of the subject information, thereby the subject information is shared between the image capturing apparatuses 101a to 101d. Note that the method of designating the subject is not limited to the method in which the user designates the subject using the input unit 211; for example, there are other methods such as automatically detecting and designating a face or a preset subject.

Next, in step S304, the CPU 207 of the image capturing apparatus 101a determines which of the image capturing apparatuses 101a to 101d constituting the image capturing system is to be used as the primary apparatus (reference apparatus) for synchronous shooting. As described above, the primary apparatus is the apparatus that manages time that serves as a reference to which a plurality of apparatus are to be synchronized. One of the image capturing apparatuses 101a to 101d constituting an image capturing system that performs synchronous shooting has to be the primary apparatus, and the other three apparatuses are secondary apparatuses. Note that details of primary apparatus determination processing in step S304 will be described later with reference to FIGS. 4A and 4B.

In step S305, the CPU 207 of the primary apparatus uses the network processing unit 210 to exchange data for synchronizing time with the secondary apparatuses, and the secondary apparatuses adjust the clock circuits 214a of the synchronization control units 214 to synchronize with the time of the primary apparatus. As a result, the times of all image capturing apparatuses 101a to 101d are synchronized. Note that details of the time synchronization processing in step S305 will be described later with reference to FIG. 5.

Then, in step S306, upon receiving a shooting instruction from the user via the input unit 211 of the image capturing apparatus 101a, the CPU 207 of the image capturing apparatus 101a sends a shooting instruction to the CPU 207 of the primary apparatus. Note, if the image capturing apparatus 101a itself is the primary apparatus, there is no need to send it. In response to the shooting instruction, the CPU 207 of the primary apparatus controls the synchronization control unit 214 to set the shooting start time, prepares for shooting, and sends information regarding the shooting timing to the secondary apparatuses using the network processing unit 210.

Then, when the set time comes, the synchronization signal output circuits 214b of the synchronization control units 214 of the image capturing apparatuses 101a to 101d constituting the image capturing system output a shooting synchronization signal to the image shooting units 213, thus shooting is started and the shot images are recorded in the memories 209.

Thereafter, upon receiving an end-shooting instruction from the user via the input unit 211 of the image capturing apparatus 101a, the CPU 207 of the image capturing apparatus 101a sends the end-shooting instruction to the CPU 207 of the primary apparatus. Note, if the image capturing apparatus 101a itself is the primary apparatus, there is no need to send it. In response to the end-shooting instruction, the CPU 207 of the primary apparatus controls the image shooting unit 213 and the synchronization control unit 214 to end the shooting. At the same time, the CPU 207 of the primary apparatus sends end-shooting notification to the secondary apparatuses using the network processing unit 210 to end the shooting.

Next, in step S307, the CPU 207 of the primary apparatus sends the image stored in the memory 209 to the server 103 via the network processing unit 210. It also instructs the secondary apparatuses to send the captured images to the server 103. Note that the process in step S307 may be performed by the CPU 207 of the image capturing apparatus 101a with respect to the image capturing apparatuses 101b to 101d. With the above steps, the synchronous shooting processing ends.

The server 103 executes applications such as three-dimensional image synthesis processing on the images received from the image capturing apparatuses 101a to 101d based on time information appended in the images. In this embodiment, a case has been described in which synchronously shot images are collected on the server 103 and processed, but the present invention is not limited to this. For example, images may be transferred to the image capturing apparatus 101a operated by the user, and processed there.

Figure 4A:
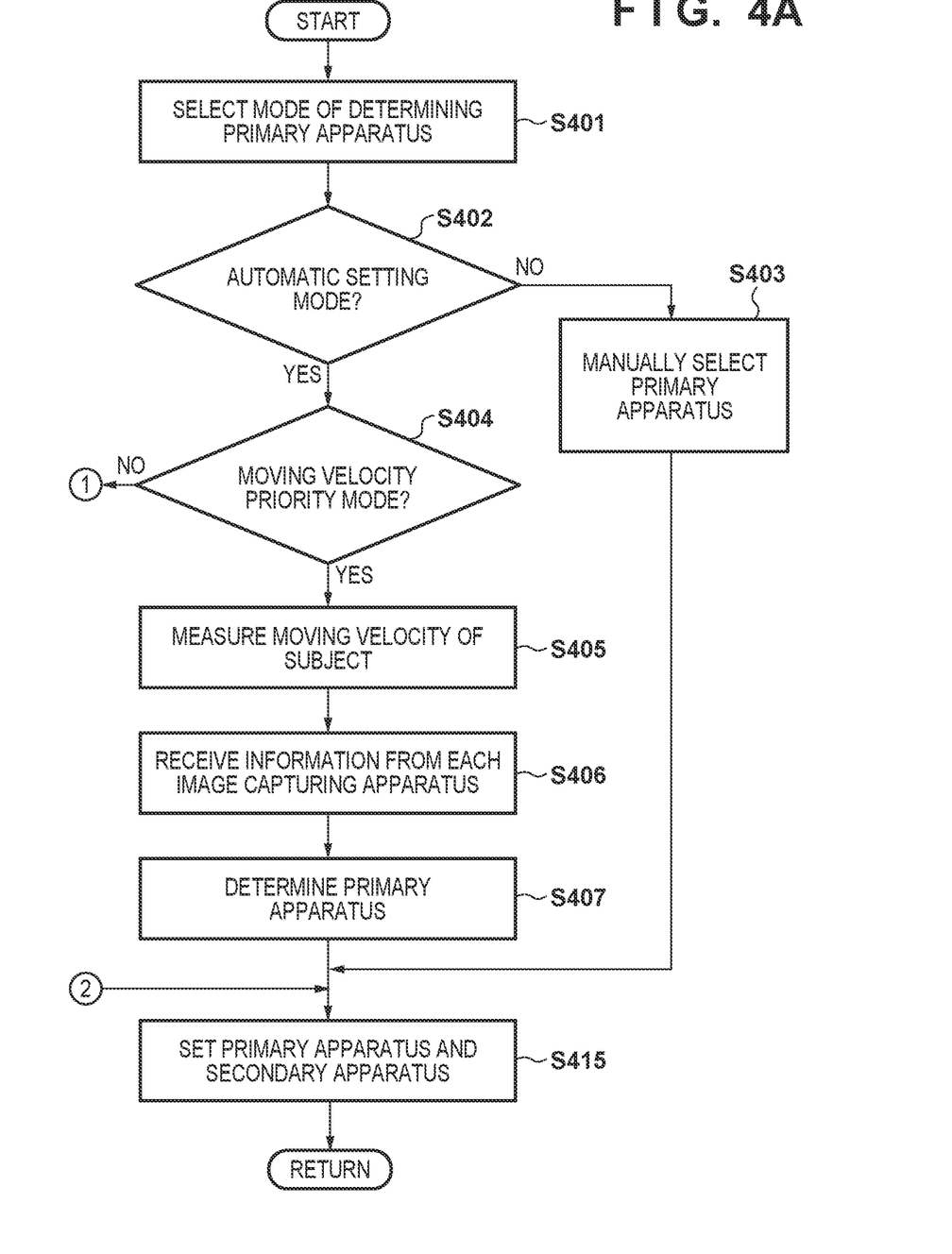
FIGS. 4A and 4B illustrate a flowchart of a primary apparatus determination processing according to the embodiment.
Figure 4B:
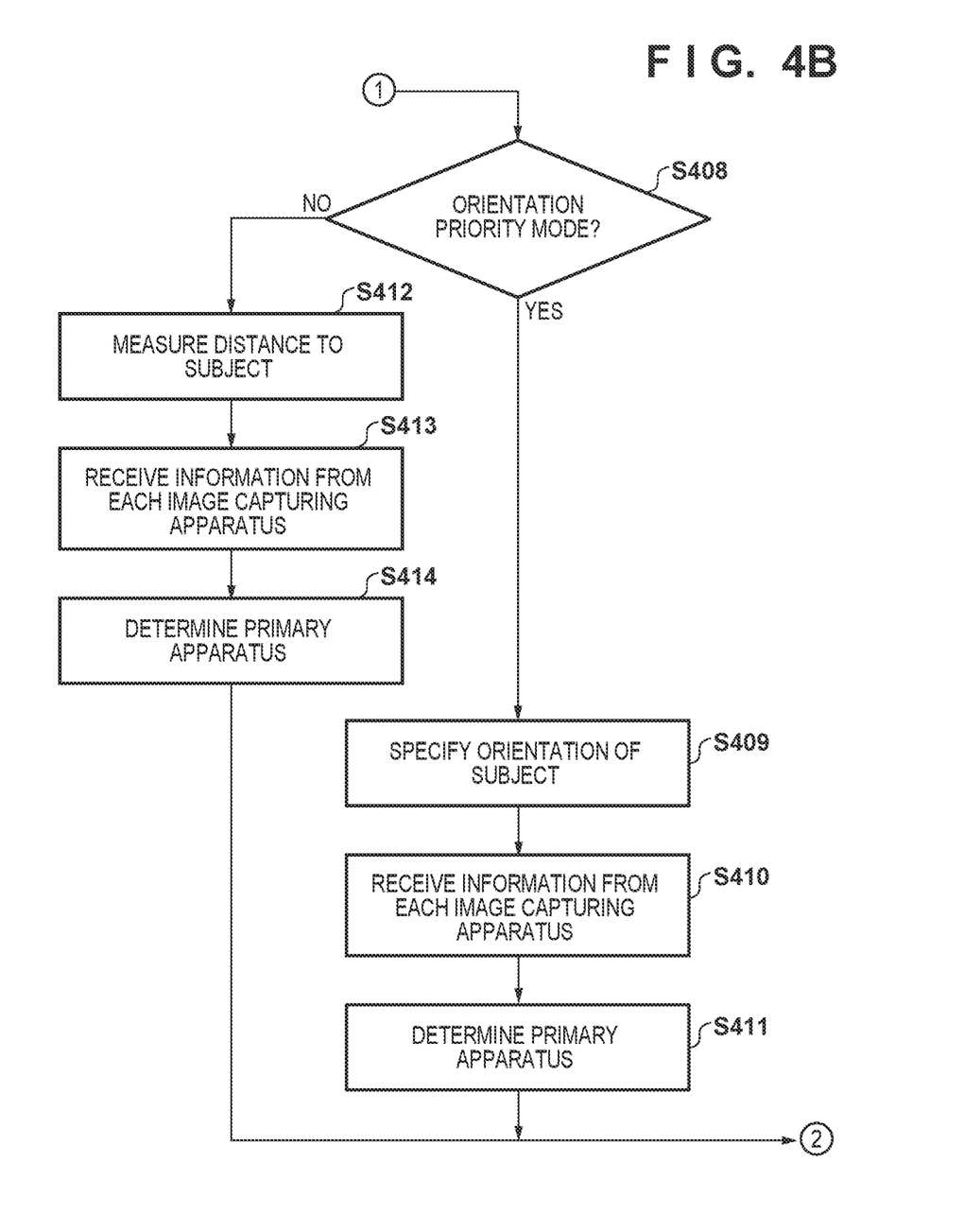

Next, with reference to FIGS. 4A and 4B, the primary apparatus determination processing performed in step S304 will be described.

In step S401, the user uses the input unit 211 of the image capturing apparatus 101a being operated by the user to select a determination mode related to the method of determining the primary apparatus. The mode to be selected first is an automatic setting mode or a manual setting mode. The automatic setting mode is a mode in which the primary apparatus is determined by the image capturing apparatuses 101a to 101d constituting the image capturing system according to the subject to be shot. The manual setting mode is a mode in which user selects the primary apparatus from among the image capturing apparatuses 101a to 101d.

If the manual setting mode is selected in step S402, the CPU 207 advances the process to step S403.

In step S403, the CPU 207 of the image capturing apparatus 101a displays device information of the image capturing apparatuses 101a to 101d constituting the image capturing system on the display unit 212. Next, through the input unit 211, the CPU 207 obtains input information from the user to select which of the image capturing apparatuses 101a to 101d should be the primary apparatus, and determines the primary apparatus based on the input information.

Then, the CPU 207 of the image capturing apparatus 101a advances the process to step S415, and if the selected image capturing apparatus is the image capturing apparatus 101a being operated by the user, sets the image capturing apparatus 101a as the primary apparatus. If the selected image capturing apparatus is one of the image capturing apparatuses 101b to 101d, the CPU 207 notifies the selected image capturing apparatus of being selected as the primary apparatus. Further, the CPU 207 sends, to image capturing apparatuses other than the primary apparatus, notification indicating that they will be secondary apparatuses.

On the other hand, if the automatic setting mode is selected in step S402, the CPU 207 of the image capturing apparatus 101a displays three types of submodes included in the automatic setting mode on the display unit 212 in the subsequent processes, and let the user make a selection. Here, the three types of submodes are a moving velocity priority mode, an orientation priority mode, and a distance priority mode.

First, if it is determined in step S404 that the user selects the moving velocity priority mode, the CPU 207 of the image capturing apparatus 101a advances the process to step S405 and starts measuring the moving velocity of the subject. In step S405, the CPU 207 of the image capturing apparatus 101a requests the image capturing apparatuses 101b to 101d to measure the moving velocities of the subject in the live view images through the network processing unit 210. The CPU 207 of the image capturing apparatus 101a also calculates the moving velocity of the subject in the live view image shot by its own image shooting unit 213.

In step S406, the CPU 207 of the image capturing apparatus 101a obtains requested information regarding the moving velocity of the subject from the image capturing apparatuses 101b to 101d through the network processing unit 210.

In step S407, the CPU 207 of the image capturing apparatus 101a compares the information regarding the moving velocities of the subject from the image capturing apparatuses 101a to 101d, and determines the image capturing apparatus that is capturing the live view image with the fastest moving velocity of the subject as the primary apparatus, and the process advances to step S415.

Figure 7A:
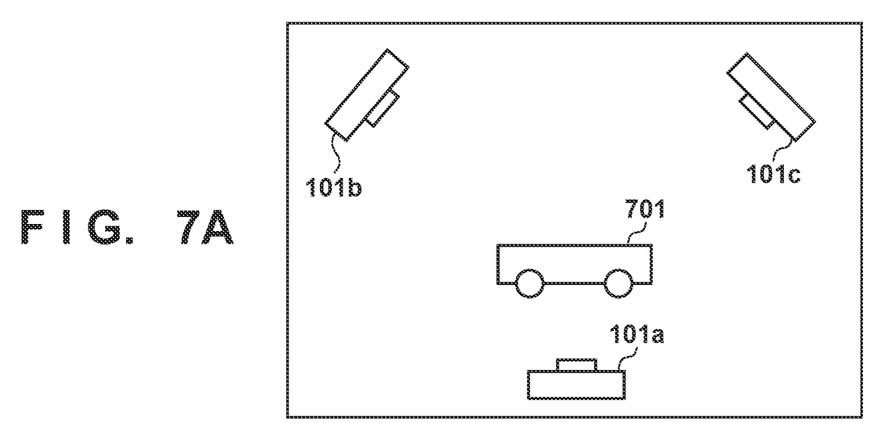
FIGS. 7A to 7C are diagrams illustrating the relationship between image capturing apparatuses and a subject in determining a primary apparatus according to the embodiment.

Here, a method of determining the primary apparatus based on the moving velocity of the subject will be explained using FIG. 7A. Although FIG. 7A shows the image capturing apparatuses 101a to 101c, the same applies to the case where the image capturing apparatus 101d is installed. Each of the image capturing apparatuses 101a to 101c calculates the moving velocity of the subject 701 specified in step S303 from a live view image obtained by performing live view shooting for a predetermined period of time. For example, as shown in FIG. 7A, if the subject 701 is a car in the center of the figure and the car is moving from left to right, the moving velocity of the subject 701 is fastest in the image shot by the image capturing apparatus 101a. In this case, the image capturing apparatus 101a is determined as the primary apparatus.

On the other hand, if the user does not select the moving velocity priority mode in step S404, the CPU 207 of the image capturing apparatus 101a advances the process to step S408, and checks whether the mode selected by the user is the orientation priority mode. If the user selects the orientation priority mode, the CPU 207 of the image capturing apparatus 101a advances the process to step S409 and starts specifying the orientation of the subject. In step S409, the CPU 207 of the image capturing apparatus 101a requests the image capturing apparatuses 101b to 101d to specify the orientation of the subject through the network processing unit 210. Further, the CPU 207 of the image capturing apparatus 101a also specifies the orientation of the subject in the live view image shot by its own image shooting unit 213.

In step S410, the CPU 207 of the image capturing apparatus 101a obtains requested information regarding the orientations of the subject from the image capturing apparatuses 101b to 101d through the network processing unit 210.

In step S411, the CPU 207 of the image capturing apparatus 101a compares the information regarding the orientation of the subject acquired from the image capturing apparatuses 101a to 101d, and determines the image capturing apparatus that is shooting the subject from the direction closest to the front of the subject as the primary apparatus. Then, the process advances to step S415.

Figure 7B:
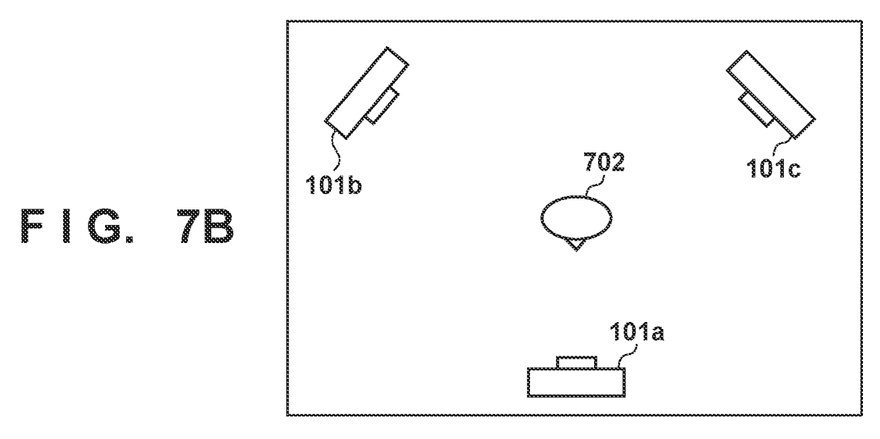

Here, a method of determining the primary apparatus based on the orientation of the subject will be described using FIG. 7B. Although FIG. 7B shows the image capturing apparatuses 101a to 101c, the same applies to the case where the image capturing apparatus 101d is installed. Each of the image capturing apparatuses 101a to 101c determines the orientation of the subject 702 specified in step S303 from a live view image at a predetermined time. For example, as shown in FIG. 7B, if the subject 702 is a human being, the image capturing apparatus 101a is the image capturing apparatus that shoots the subject 702 from the direction closest to the front of the subject. In this case, the image capturing apparatus 101a is determined as the primary apparatus. Note that with respect to detection of the orientation of the subject 702, subjects that are frequently shot, such as people, animals, and vehicles are subjected to the detection of the orientation, and the orientation of the subject 702 is determined using a method such as deep learning object detection.

Note that the orientation of the subject for determining the primary apparatus is not limited to the front, but may be any specified orientation. In that case, for example, the orientation may be designated using the input unit 211 of the image capturing apparatus 101a.

On the other hand, if the user does not select the orientation priority mode in step S408, the CPU 207 of the image capturing apparatus 101a advances the process to step S412, assumes that the user has selected the distance priority mode, and starts measuring the distance to the subject. In step S412, the CPU 207 of the image capturing apparatus 101a requests the image capturing apparatuses 101b to 101d to measure the shooting distance to the subject through the network processing unit 210. The CPU 207 of the image capturing apparatus 101a also measures the distance to the subject in the live view image shot by its own image shooting unit 213.

In step S413, the CPU 207 of the image capturing apparatus 101a obtains requested information regarding the distances to the subject from the image capturing apparatuses 101b to 101d through the network processing unit 210.

In step S414, the CPU 207 of the image capturing apparatus 101a compares the information regarding the distances to the subject acquired from the image capturing apparatuses 101a to 101d, determines the image capturing apparatus with the shortest distance to the subject as the primary apparatus, and then advances the process to step S415.

Figure 7C:
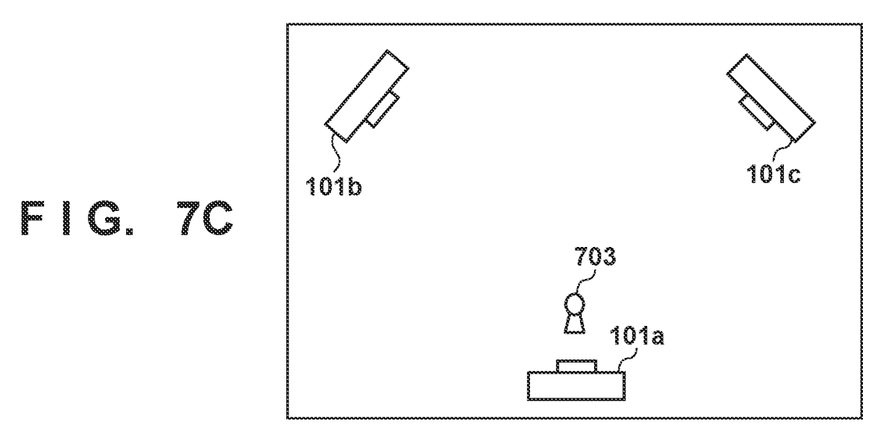

Here, a method of determining the primary apparatus based on the distance to the subject will be explained using FIG. 7C. Although FIG. 7C shows the image capturing apparatuses 101a to 101c, the same applies to the case where the image capturing apparatus 101d is installed. Each of the image capturing apparatuses 101a to 101c calculates the distance to the subject 703 specified in step S303 from a live view image at a predetermined time. For example, in the case of the example shown in FIG. 7C, the image capturing apparatus 101a is the image capturing apparatus with the shortest distance to the subject 703. In this case, the image capturing apparatus 101a is determined as the primary apparatus.

As described above, the primary apparatus is determined using a method according to the set mode.

The manual setting mode allows the user to set any device as the primary apparatus, and is used in a case where the apparatus desired to be the primary apparatus is known in advance.

On the other hand, the moving velocity priority mode of the automatic setting mode is used in a case where the moving direction of the subject is known, for example. Since the primary apparatus is an apparatus that serves as a reference for time synchronization, the error in shooting timing is relatively small compared to the secondary apparatuses. Therefore, by setting the image capturing apparatus that shoots a subject with the fastest moving velocity as the primary apparatus, it is possible to reduce the error in the shooting timing of synchronous shooting with the secondary apparatuses. This makes it possible to suppress image quality deterioration after image generation when shooting a subject moving at high speed, which is a cause of image quality deterioration.

Further, the orientation priority mode is used in a case the orientation of the subject is known, for example. Since the primary apparatus is a device that serves as a reference for time synchronization, the error in shooting timing is relatively small compared to the secondary apparatuses. Therefore, by setting the image capturing apparatus that shoots the subject from the direction closet to the front of the subject as the primary apparatus, it is possible to suppress deterioration in image quality in the direction in which the user wants to watch the image.

Further, the distance priority mode is used in a case where the distance to the subject is known, for example. Since the closer to the object, the larger the shooting error becomes, so by setting the image capturing apparatus that shoots the object from the close distance as the primary apparatus, it is possible to suppress deterioration in image quality after image generation.

Figure 5:
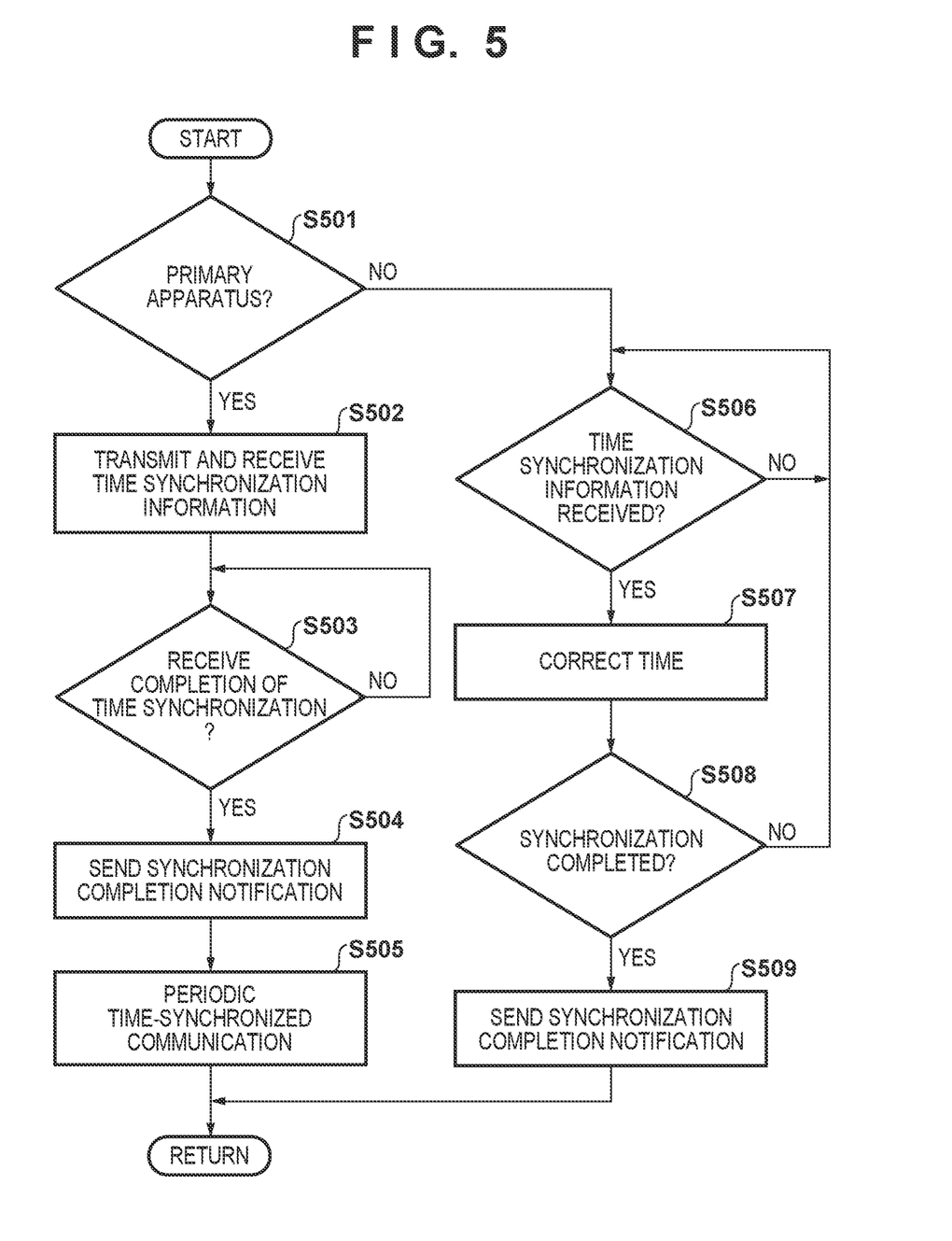
FIG. 5 is a flowchart illustrating time synchronization processing between image capturing apparatuses according to the embodiment.

Next, the time synchronization process performed in step S305 will be described with reference to FIG. 5. This processing is performed in each of the image capturing apparatuses 101a to 101d that constitute the image capturing system.

First, in step S501, the CPU 207 of each of the image capturing apparatuses 101a to 101d determines whether its own image capturing apparatus is the primary apparatus. If the image capturing apparatus itself is the primary apparatus, the process advances to step S502.

In step S502, the CPU 207 of the primary apparatus transmits and receives packets for time synchronization to and from the secondary apparatuses through the network processing unit 210. Details of packet exchange during time synchronization will be described later using FIG. 6.

In step S503, the CPU 207 of the primary apparatus waits for a time synchronization completion packet from each secondary apparatus, and upon receiving time synchronization completion notifications from all secondary apparatuses, advances the process to step S504.

In step S504, the CPU 207 of the primary apparatus sends a synchronization completion notification to all secondary apparatuses.

In step S505, the CPU 207 of the primary apparatus keeps performing the process of periodical time-synchronized communication with all secondary apparatuses.

On the other hand, if it is determined in step S501 that the image capturing apparatus itself is not the primary apparatus but the secondary apparatus, the CPU 207 advances the process to step S506 and waits for a packet for time synchronization from the primary apparatus.

In step S506, upon receiving the packet for time synchronization from the primary apparatus, the CPU 207 of the secondary apparatus advances the process to step S507.

In step S507, the CPU 207 of the secondary apparatus controls the synchronization control unit 214 to correct the time information of the clock circuit 214a based on the received packet for time synchronization.

Then, in step S508, the CPU 207 of the secondary apparatus continues to make corrections based on the time information periodically transmitted from the primary apparatus. The CPU 207 of the secondary apparatus determines the completion of synchronization on the condition that the correction value at a predetermined time falls within a certain range. When the CPU 207 of the secondary apparatus determines that the synchronization is completed, the process proceeds to step S509.

In step S509, the CPU 207 of the secondary apparatus notifies the primary apparatus of the completion of synchronization.

Figure 6:
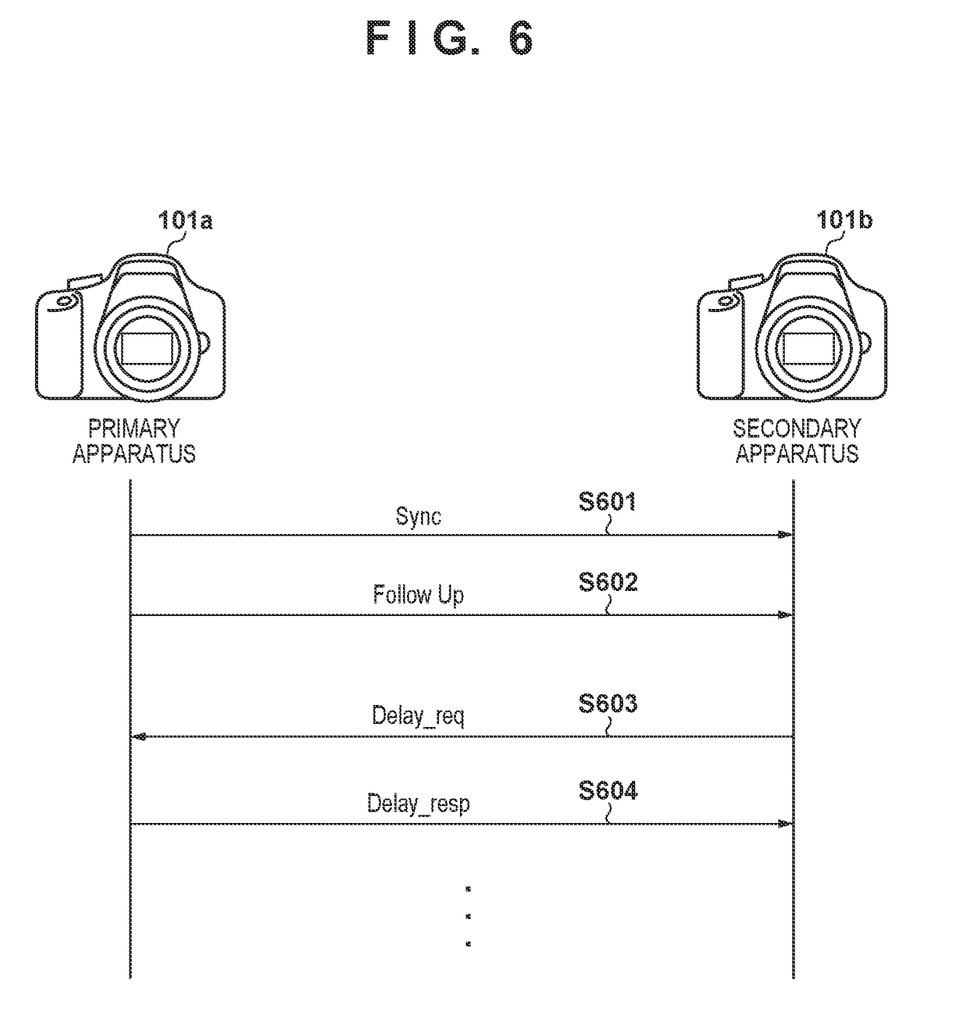
FIG. 6 is a diagram illustrating a packet communication sequence for time synchronization between image capturing apparatuses according to the embodiment.

Next, details of the exchange of packets for time synchronization (synchronization information) between the primary apparatus and the secondary apparatus will be described using FIG. 6. Through this exchange of packets, the delay in the network path is estimated, and the secondary apparatus can synchronize with the time of the primary apparatus by taking the amount of delay into consideration. The method described in this embodiment is an example of what is called a TWO-STEP method, and other methods such as the ONE-STEP method also exist.

In sequence S601, the primary apparatus transmits a Sync packet to the secondary apparatus. The Sync packet contains information indicating that the current synchronization method is the TWO-STEP method. When the secondary apparatus receives the Sync packet, it stores the time of reception.

In sequence S602, the primary apparatus transmits a Follow-Up packet. The Follow-Up packet contains information about the transmission time of the Sync packet sent immediately before. The secondary apparatus calculates the delay time in the communication path from the primary apparatus to the secondary apparatus from the difference between the transmission time of the Sync packet written in the Follow-Up packet and the reception time of the Sync packet stored therein.

Next, in sequence S603, the secondary apparatus transmits a Delay-req packet to the primary apparatus, and stores the transmission time of the Delay-req packet. The primary apparatus stores the reception time of the Delay-req packet.

In sequence S604, the primary apparatus transmits a Delay-resp packet to the secondary apparatus. The Delay-resp packet contains information about the reception time when the primary apparatus received the Delay-req packet. The secondary apparatus calculates the delay time in the communication path from the secondary apparatus to the primary apparatus from the difference between the transmission time of the Delay-req packet and the reception time of the Delay-req packet stored in the Delay-resp packet.

By periodically exchanging the above packets, the secondary apparatus can periodically perform corrections to match the time to that of the primary apparatus, thus can periodically perform time synchronization.

As described above, according to the present embodiment, in an image capturing system that performs synchronous shooting using a plurality of image capturing apparatuses, the primary apparatus that controls time synchronization processing for synchronizing the shooting timing of each image capturing apparatus is determined according to the subject. By doing so, it is possible to suppress deterioration in the image quality of an image generated based on a plurality of images obtained by synchronous shooting.

Other Embodiments

Note that the present invention may be applied to a system composed of a plurality of devices, or to a device composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-001915, filed Jan. 10, 2023 which is hereby incorporated by reference herein in its entirety.

What is claimed is:

1. A control apparatus comprising one or more processors and/or circuitry which function as:
    an acquisition unit that acquires information about a subject from a plurality of image capturing apparatuses connected to an image capturing system via a communication network;
    a determination unit that determines a reference apparatus among the plurality of image capturing apparatuses, which serves as a reference for synchronizing time between the plurality of image capturing apparatuses based on the acquired information about the subject; and
    a communication unit that communicates information indicating whether or not each image capturing apparatus is the reference apparatus to each of the plurality of image capturing apparatuses,
    wherein the plurality of image capturing apparatuses are capable of synchronous shooting in synchronization with the time of the reference apparatus.

2. The control apparatus according to claim 1, wherein the control apparatus is one of the plurality of image capturing apparatuses.

3. The control apparatus according to claim 1, wherein the one or more processors and/or circuitry further function as a selection unit that selects one of a plurality of predetermined modes,
    wherein the acquisition unit acquires the information about the subject in accordance with the selected mode from the plurality of image capturing apparatuses.

4. The control apparatus according to claim 3, wherein the plurality of modes include a first mode relating to moving velocities of the subject on images shot by the plurality of image capturing apparatuses, and
    in a case where the first mode is selected by the selection unit, the determination unit determines as the reference apparatus the image capturing apparatus from which information about the subject with a fastest moving velocity is acquired among the information about the subject acquired from the plurality of image capturing apparatuses.

5. The control apparatus according to claim 3, wherein the plurality of modes include a second mode relating to orientations of the subject in images shot by the plurality of image capturing apparatus, and
    in a case where the second mode is selected by the selection unit, the determination unit determines as the reference apparatus the image capturing apparatus from which information about the subject whose orientation is closest to a front in an image is acquired among the information about the subject acquired from the plurality of image capturing apparatuses.

6. The control apparatus according to claim 3, wherein the plurality of modes include a third mode relating to distances to the subject in images shot by the plurality of image capturing apparatus, and
    in a case where the third mode is selected by the selection unit, the determination unit determines as the reference apparatus the image capturing apparatus from which information about the subject indicative of a distance to the subject being shortest is acquired among the information about the subject acquired from the plurality of image capturing apparatuses.

7. The control apparatus according to claim 1, wherein the plurality of modes include a manual setting mode for manually designating the reference apparatus, and
    in a case where the manual setting mode is set, the determination unit determines the manually designated image capturing apparatus as the reference apparatus among the plurality of image capturing apparatuses.

8. An image capturing system in which a plurality of image capturing apparatuses are connected via a communication network, including a control apparatus comprising one or more processors and/or circuitry which function as:
    an acquisition unit that acquires information about a subject from a plurality of image capturing apparatuses connected to an image capturing system via a communication network;
    a determination unit that determines a reference apparatus among the plurality of image capturing apparatuses, which serves as a reference for synchronizing time between the plurality of image capturing apparatuses based on the acquired information about the subject; and
    a communication unit that communicates information indicating whether or not each image capturing apparatus is the reference apparatus to each of the plurality of image capturing apparatuses,
    wherein the plurality of image capturing apparatuses are capable of synchronous shooting in synchronization with the time of the reference apparatus, and
    wherein each of the plurality of image capturing apparatuses comprises:
        an image sensor; and
        a control unit that controls to synchronize time with the reference apparatus and perform synchronous shooting by the image sensor.

9. The image capturing system according to claim 8, wherein, among the plurality of image capturing apparatuses, the control unit of an image capturing apparatus other than the reference apparatus finds a delay time that occurs in communication via the communication network by transmitting and receiving synchronization information including time information on transmission time to/from the reference apparatus via the communication network, and synchronizes with the time of the reference apparatus.

10. The image capturing system according to claim 8, wherein the information about the subject is acquired from a live view image through live view shooting by the image sensor of each of the plurality of image capturing apparatuses without synchronizing with the reference apparatus.

11. The image capturing system according to claim 8 further comprising an apparatus that comprises one or more processors and/or circuitry which function as a synthesis unit that synthesizes a plurality of images obtained from the plurality of image capturing apparatuses by synthesizing the plurality of image capturing apparatuses with the times of the reference apparatus and performing synchronous shooting.

12. A control method for controlling an image capturing system in which a plurality of image capturing apparatuses are connected via a communication network, comprising:
   acquiring information about a subject from a plurality of image capturing apparatuses connected to an image capturing system via a communication network;
   determining a reference apparatus among the plurality of image capturing apparatuses, which serves as a reference for synchronizing time between the plurality of image capturing apparatuses based on the acquired information about the subject; and
   communicating information indicating whether or not each image capturing apparatus is the reference apparatus to each of the plurality of image capturing apparatuses,
   wherein the plurality of image capturing apparatuses perform synchronous shooting in synchronization with the time of the reference apparatus.

13. A non-transitory computer-readable storage medium, the storage medium storing a program that is executable by the computer, wherein the program includes program code for causing the computer to function as a control apparatus comprising:
   an acquisition unit that acquires information about a subject from a plurality of image capturing apparatuses connected to an image capturing system via a communication network;
   a determination unit that determines a reference apparatus among the plurality of image capturing apparatuses, which serves as a reference for synchronizing time between the plurality of image capturing apparatuses based on the acquired information about the subject; and
   a communication unit that communicates information indicating whether or not each image capturing apparatus is the reference apparatus to each of the plurality of image capturing apparatuses,
   wherein the plurality of image capturing apparatuses are capable of synchronous shooting in synchronization with the time of the reference apparatus.

* * * * *